United States Patent [19]

Loshbough et al.

[11] 4,307,392

[45] Dec. 22, 1981

[54] DIGITAL DISPLAY VERIFICATION

[75] Inventors: Richard C. Loshbough; Edward G. Pryor, both of Westerville, Ohio

[73] Assignee: Reliance Electric Co., Cleveland, Ohio

[21] Appl. No.: 104,276

[22] Filed: Dec. 17, 1979

[51] Int. Cl.³ .......................... G06F 3/14; G08B 5/22
[52] U.S. Cl. .................................. 340/715; 340/642; 340/762
[58] Field of Search .................. 340/715, 641, 642

[56] References Cited
U.S. PATENT DOCUMENTS

| | | | |
|---|---|---|---|
| 3,753,226 | 8/1973 | Schnurmann et al. | 340/715 X |
| 3,866,171 | 2/1975 | Loshbough | 340/715 X |
| 3,943,500 | 3/1976 | Buchanan | 340/642 |
| 4,188,625 | 2/1980 | Hodemaekers | 340/642 |

*Primary Examiner*—David L. Trafton
*Attorney, Agent, or Firm*—Watts, Hoffmann, Fisher & Heinke Co.

[57] ABSTRACT

A scale is disclosed which includes a digital display unit for conveying information. A display verification method and system are employed for determining whether a plurality of information conveying segments forming the indicators of the display unit are properly conveying information. Individual segments of the display unit are operated under control of a microprocessor. Segment status determining circuitry determines the operative status of each of the segments by sequentially monitoring a voltage drop indicative of the current passing through an LED comprising that segment. The status determining circuitry produces status information which is stored in the microprocessor memory and compared with data indicative of the information the display should convey if it is properly functioning. If the comparison indicates that one of the segments is not properly conveying the information, warning messages are displayed which indicate maintenance procedures are required. If all segments are correctly displaying information, the verification procedure is repeated.

13 Claims, 11 Drawing Figures

DIGITAL DISPLAY VERIFICATION

BACKGROUND OF THE INVENTION

1. Field of the Invention

The present invention relates to digital displays and more particularly to an improved method and system for verifying that the information conveyed by such a display is correct.

2. Prior Art

Many electronic devices include displays of information in digital form. Commercial weighing scales, for example, often include numerical displays of price and weight. A typical display includes a set of indicators, each comprising an array of information conveying segments. Seven such segments can be arranged and operated to display any number from 0 to 9. Four of the segments are oriented vertically as spaced vertical pairs and the remaining three segments are disposed horizontally at the top, center, and bottom of the array.

It is important for the user to be certain that each segment of such a display functions properly. For example, if an "8" is to be displayed and the central horizontal segment fails to operate properly, a "0" will be indicated. For this reason, automatic display verification is now included as an integral part of some food weighing scales. In West Germany such verification is legally mandated for food scales.

Systems for verifying the functioning of all segments comprising a display have been suggested. One such system is described in U.S. Pat. No. 4,159,521 issued June 26, 1979, assigned to the assignee of the present invention.

The apparatus disclosed in that application includes circuitry which when actuated presents predetermined information signals to the display. For example, all eights may be presented to and viewed on the display for verification that all segments properly respond to the predetermined information signals. The system also includes circuitry for removing information signals from all segments of the display to insure that no segment continues to respond after the signal is removed. This technique for verification requires the user to both initiate the verification and to interpret the results displayed. This scheme dependent on user actuation fails, moreover, to comply with laws requiring automatic verification.

A second suggested verification scheme is shown in U.S. Pat. No. 3,866,171 which has also been assigned to the assignee of the present invention. The technique disclosed in the U.S. Pat. No. 3,866,171 is that of verifying that energization signals applied to display segments generate voltages across the segments within certain ranges. If the voltage falls within one range the segment is assumed to be on. If the voltage is not in that range, the segment is either assumed to be off or malfunctioning depending upon the specific voltage across the segment. This technique of display verification is useful but has in the past been accomplished in a somewhat complex manner.

The display verification apparatus shown in the U.S. Pat. No. 3,866,171 comprises a number of parallel circuit arrangements each utilizing a separate amplifier circuit to verify the functioning of a display segment. These parallel circuits provide a number of concurrent signals to a comparator which compares the signal to an appropriate one of a set of reference signal inputs to the comparator. If the comparator inputs are equal, the display is properly functioning and can be utilized to display information. If any segment is malfunctioning, however, the comparator indicates that fact by displaying an error signal.

The amount of hard wire circuitry utilized to accomplish verification as disclosed in the U.S. Pat. No. 3,866,171 is substantial since each segment has its own circuit for sending an appropriate signal to the comparator. Further, if an error exists in data transmitted to the display, this error is transmitted to the comparator and will not be detected. The system embodied by the '171 patent does not, therefore, determine whether circuitry external to the display is accurately transmitting data to that display.

SUMMARY OF THE INVENTION

The present invention provides a new and improved method and system for displaying information and for verifying the correct functioning of segments forming a display. The verification circuitry has been simplified and the system includes the capability of verifying that the information to be displayed is correctly presented to the display unit. The verification is automatic and not dependent upon user actuation and interpretation.

One embodiment of the invention includes a display unit having a plurality of segments for displaying information. A control unit is included which also stores data corresponding to the information to be displayed. This data is utilized to control operation of the segments included in the display unit.

Segment status determining circuitry is coupled to the display unit for determining the operating status of each segment. The status determining circuitry is also coupled to the control unit for transmission of status signals indicative of the operating condition of each segment. The control unit includes comparison circuitry for receiving the status signals and verifying the segments are conveying information corresponding to the data stored in the control unit.

One important feature of this embodiment is that the control unit comparison verifies not only that the display segments are properly conveying the information, but also verifies the functioning of the drive unit and segment status determining circuitry. If data is improperly stored in the drive unit, for example, the control unit comparison produces a warning to the user. Since the data originates in the control unit and the comparison step also occurs in the control unit, a closed loop verification system is achieved.

In one exemplary embodiment of the invention, current carrying LED's are used as display segments. In this embodiment the segment status determining circuit monitors a combined voltage drop appearing across each segment and a series coupled circuit associated with that segment. If the segment is emitting light, the combined voltage drop appearing across the LED and the series coupled circuit falls in a predetermined range. In this way status signals are generated by the status determining circuit indicative of whether the LED segment is emitting light.

In the exemplary embodiment of the invention, the status determining circuitry includes a voltage discriminator and analog switch. The discriminator receives a voltage input appearing across the coupling circuit and LED and monitors this voltage to determine whether it falls within the predetermined range. A segment status signal is generated which depends upon combined voltage drop and is transmitted to the control unit. The analog switch serves to sequentially transmit the voltage drop from other segments comprising the display unit to the discriminator for status signal generation.

A feature of this exemplary embodiment is the provision of a simplified status determining circuit which monitors the status of all segments comprising the digital display unit. The analog switch in combination with the discriminator obviates the need for separate verification circuit for each segment. The complexity and cost of prior art automatic verification circuitry is therefore reduced by utilization of this improved embodiment.

A non-equality in the comparison step made by the control unit indicates a malfunction has occurred. This malfunction may be a burned out LED, an open connection or a problem in the verification loop. A non-equality occurring in the comparison step causes the control unit to warn the user by causing a warning message to be displayed by the display unit.

The control unit may comprise a preprogrammed microprocessor. The microprocessor includes storage registers containing binary coded decimal data corresponding to the data to be displayed on the display unit. The microprocessor also includes preprogrammed storage registers containing a series of data bits corresponding to the status signals which the status determining circuitry should produce when each of the numbers "0" through "9" is properly displayed. Data stored in the control unit may, for example, indicate that a particular seven segment array in the display unit should display a "1". A unique series of status signals is then generated by the status determining circuitry if a 1 is indeed displayed by those segments. These signals are transmitted to the microprocessor for comparison with the stored series of data bits corresponding to a "1". As mentioned previously, an inequality in this comparison step causes the microprocessor to display a warning to the user.

These and other features and their advantages of the invention will become more apparent as the invention becomes better understood from the detailed description that follows, when considered in conjunction with the accompanying drawings.

DETAILED DESCRIPTION OF PREFERRED EMBODIMENT

Figure 1:
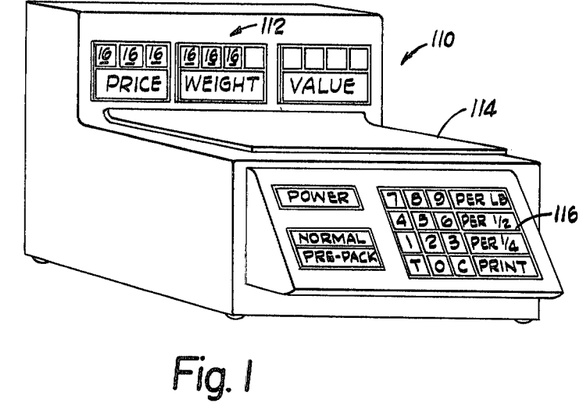
FIG. 1 is a perspective view of a scale equipped with a typical digital display unit with which the system and method of the invention may be used.

Referring to FIG. 1, there is illustrated a scale 110 having a digital display 112, a weighing surface 114, and a control panel 116. A load cell (not shown) within the scale produces electrical signals proportional to the weight of commodities on the weighing surface 114. In response to information entered on the control panel 116 and the presence of a commodity on surface 114, the display 112 indicates the price, weight, and total value of the item weighed.

Figure 2:
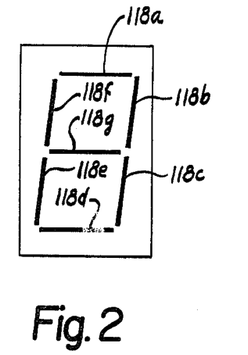
FIG. 2 shows a seven segment digital indicator configuration.

FIG. 2 illustrates an indicator with a configuration of seven segments, 118a-g, each segment comprising a light emitting diode (LED). For the scale illustrated in FIG. 1, eleven such indicators are provided to indicate the price, weight and value of the item weighed. By activating the various segments forming the indicator it is possible to display any one of the ten numbers 0-9 on each of the eleven indicators comprising the display. Circuitry within scale 110 automatically applies energization voltages to an appropriate combination of the LED's forming each indicator to illuminate those LED's in response to the weighing of the item on the weighing surface 114. It is apparent that if one or more of the LED segments becomes inoperative, the correct number will not be indicated.

Figure 3:
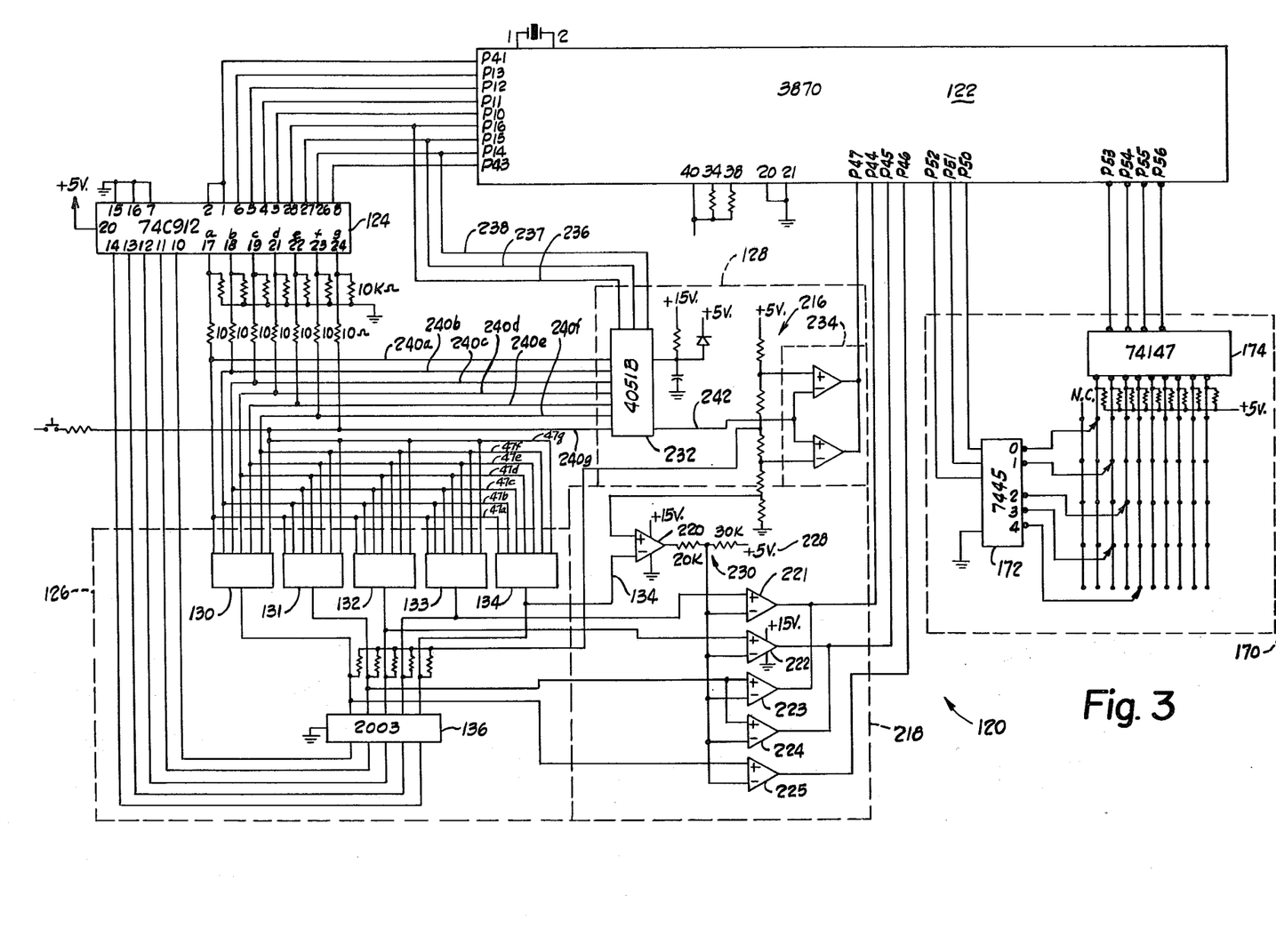
FIG. 3 is a block diagram of circuitry for implementing display verification according to the present invention.

The present invention provides a system for verifying the operation of such segments in a scale or other environment in which a digital display is employed. A schematic illustration of a digital display system 120 including segment verification is shown in FIG. 3. The display system comprises a control unit 122, a drive unit 124, a display unit 126, and a segment status determining circuit 128. The display unit 126 includes five indicators 130-134 each of which comprises seven LED's in the configuration illustrated in FIG. 2.

The drive unit 124 is coupled to display unit 126 for controlling electrical energization of the segments comprising each indicator. The drive unit has the capability for storing data which corresponds to information to be displayed on the display unit. As this display data is used to control operation of the display unit, the display system 120 verifies that the display unit 126 is actually conveying the proper information to the user.

The segment status determining circuit 128 is coupled to display unit 126 for determining the operating status of the segments forming the display unit. The segment status determining circuitry is further coupled to the control unit 122 for transmission thereto of status signals indicative of the status (on or off) of each segment in the display unit.

The segment verification scheme is performed under the control of control unit 122. It is the control unit which transmits display data to the drive unit for storage, controls transmittal of energization signals from the drive unit to the display unit, and receives status signals from the segment status determining circuit 128. Once the status signals have been stored in a control unit memory, the control unit also performs a verification step to determine whether all segments comprising the display unit have accurately displayed the information corresponding to the display data originating within the control unit and sent to the drive unit 124. In this way, a closed loop verification scheme is achieved whereby display data originating in the control unit 122 is transmitted to the drive unit, used to control energization of the display unit and results in generation of status signals whose condition is verified by a comparison occurring within the control unit.

Figure 4:
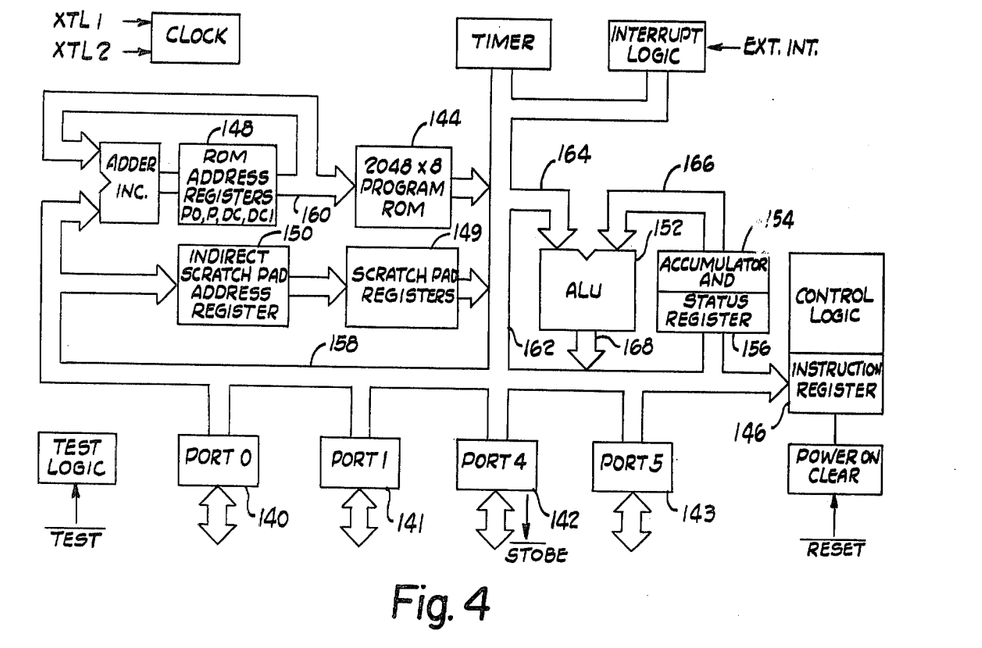
FIG. 4 is a schematic representation of the internal structure of a microprocessor which may be employed in performing the display verification.

One suitable control unit for performing verification according to the invention comprises a preprogrammed microprocessor. A schematic of one such microprocessor, a Motorola Corporation 3870 is shown in FIG. 4. This microprocessor is an eight bit per byte microprocessor with four eight bit input and output ports 140-143. It includes a two kilobyte programmable Rom (read only memory) 144 containing a series of instructions (program) which the microprocessor performs in sequence to achieve the system verification.

A detailed description of the elements comprising the 3870 microprocessor is available in a Motorola semiconductor information booklet for that microprocessor. The contents of that booklet are incorporated herein by reference.

In addition to the preprogrammed ROM 144, the 3870 includes an instruction register 146, a number of ROM address registers 148, an indirect scratch pad register (ISAR) 150, an arithmetic logic unit (ALU) 152, an accumulator 154, status register 156, and the input and output ports. The use and functioning of each of these elements will be briefly explained and examined in depth as needed as the verification method and system is described.

The instruction register 146 receives an operation code representing an instruction to be executed from the programmed ROM 144 by a data bus 158. During an operation instruction, eight bits are latched into the instruction register 146 and decoded to provide the necessary control gating signals to all circuit elements within the microprocessor.

There are four eleven bit ROM address registers 148 associated with the two kilobyte preprogrammed Rom 144. These registers comprise a program counter, a stack counter, a data counter, and an auxiliary data counter. The program counter (PC) is used to address the instructions from the ROM 144. The stack counter (P) is used to save contents of the program counter during an interrupt or subroutine call. The data counter (DC) is used to address data tables and is an automatic incrementing register.

The microprocessor is programmed with certain data constants which are stored in the preprogrammed ROM. When one of these constants is required in the execution of the verification process, an appropriate ROM address register (PC) location is gated onto a ROM address bus 160 and the ROM output for that location is gated into main data bus 162.

A scratch pad register 149 includes 64 eight bit registers which may be used as general purpose RAM memory. These 64 registers are addressed as scratch pad registers 0-77 (in octal format) and are useful for storing display data and performing arithmetic functions.

The indirect scratch pad address register (ISAR) 150 is a six bit register used to address the 64 scratch pad registers. The six bit ISAR register is divided into an upper and lower three bit set which allows the scratch pad registers to be addressed in octal format. The upper three bits represent one octal digit and the lower three bits represent a second octal digit.

After receiving instructions from the instruction register 146, the arithmetic logic unit (ALU) performs different arithmetic or logic operation using data presented to the ALU by two inputs buses 164, 166. The result of the arithmetic logic operation is provided on a result bus 168. In addition to providing a result on this bus, the ALU provides four signals representing the status of the result. These four signals are stored in the status register 156 and provide information regarding the results of the arithmetic or logic operation performed in the ALU. Further features regarding the status register can be found in the motorola MC3870 data sheet referenced earlier.

The accumulator register (ACC) 154 is the principal register for data manipulation in the 3870. The accumulator is coupled to the arithmetic logic unit (ALU) for arithmetic or logical operations. The results of ALU operations are also stored in the accumulator.

The 3870 microprocessor includes four 8 bit bi-directional input and output ports 140-143. These ports are used to either input or output data from external sources. An output instruction causes the contents of the accumulator to be latched onto an addressed port, and an input instruction transfers the contents of the port to the accumulator. The input and output pins on the 3870 are logically inverted so that a logic one in the accumulator is presented as a logic zero to external circuitry.

The 3870 microprocessor includes an internal timer and certain test and control ports whose functioning is not described as they are not used in the verification method.

One function performed by control unit 122 is the transmittal of display data from output port number one to the display driver unit for storage and subsequent control of the display unit. Each input and output port includes eight pin connections which have been labeled using a designation PXX where the first X is indicative of a particular port and the second X is indicative of the bit number of the port. Thus, the eight bits comprising input/output port number 1 are labeled P10-P17.

The display data is stored in memory registers in control unit 122 prior to utilization as controls for energization of the display unit. In a commercial scale the display data would comprise data corresponding to such information as weight and price which normally would be stored in control unit memory and then presented to drive unit 124 for display. For purposes of illustrating the present verification method and system for general use rather than in a scale, the display data is input from a data source 170 and not from a load cell or control panel. This display data is presented to input/output port number 5 on the control unit.

The FIG. 3 schematic shows an exemplary data source which comprises a series of five rotary switches, a Texas Instrument 7445 decoder 172 and a 74147 encoder 174. The decoder 172 receives a binary coded input from the conrol unit and provides a signal on one of its five outputs to one of five switches. Each switch has ten positions corresponding to the digits 0-9. A low signal at a decoder output corresponding to the decimal value of the binary coded input is communicated through the corresponding switch to one of ten encoder inputs determined by the switch setting. The encoder 174 then translates this switch setting to binary coded decimal data. By selectively addressing the switches through the decoder 172 five display digits are transmitted to the control unit for storage in SCRATCHPAD registers. These five digits are the numbers to be displayed on the display unit 126.

Figure 5:
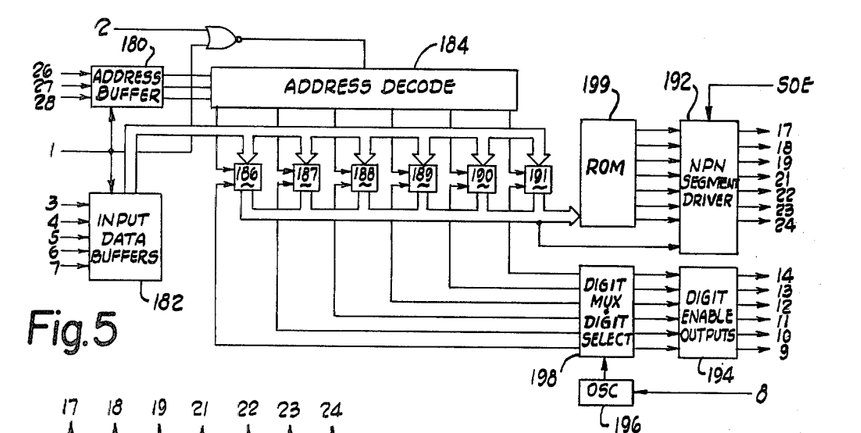
FIG. 5 is a block diagram of a drive unit for selectively energizing segments forming the display.

After the display data has been stored in control unit 122 binary coded decimal format to form the display data it is transmitted to the drive unit 124 and thereafter used to form the display of the five digits by the display unit 126. Referring now to FIG. 5 along with FIG. 3, drive unit 124 preferably comprises a National Semiconductor 74C912 six digit binary coded decimal display controller/driver. The pin numbers illustrated in FIG. 3 on the drive unit input and outputs correspond to pin number designations on the 74C912.

As shown in FIG. 5, the 74C912 comprises an address buffer 180, a data input buffer 182, an address decoder 184, six five bit storage registers 186-191, a segment driver 192 and a digit enable unit 194.

Inputting of data into drive unit 124 during the verification process is controlled by control unit 122. When a signal appears at control unit output pin P41 (indicating pin number 1 on input/output port number 4), the address and input data buffers 180, 182 in drive unit 124 latch on address and display data appearing at input pins 26, 27, 28 and 3, 4, 5, 6, 7 respectively. Since as seen in FIG. 5, input pins 1 and 2 of drive unit 124 are tied together, this control unit signal on pin 41 also causes the display data to be stored in addressed storage register 186-191. In this manner, display data appearing on input pins 3, 4, 5, 6, 7, is stored in the different drive unit storage registers.

Since the particular display unit 126 utilized in the disclosed verification scheme includes only five indicators, one of drive unit's six registers is loaded with data which is never displayed.

During a so-called free running mode of operation selected by control unit 122 with a signal at pin 8 of drive unit 124, an oscillator 196 causes a digit multiplexing and select unit 198 to sequentially activate through digit enable unit 194 each of the five indicators 130-134 in display unit 126. As a particular indicator is activated, binary coded decimal data corresponding to the number to be displayed by that indicator is transmitted from a drive unit storage register 186-191 to a preprogrammed ROM 199. The ROM instructs the drive unit segment driver 192 (See FIG. 5) as to the segments to energize in order to display that number. When a subsequent indicator is activated, other binary coded data is transmitted from a different drive unit register to ROM 199 for controlled energization of an appropriate combination of segments of the subsequent indicator. In the free running mode of operation this process continues until all five indicators have been activated and the segments forming those indicators energized.

The display unit 126 comprises the five indicators 130-134 and a coupling circuit 136 for interfacing drive unit 124 to the indicators. Each indicator comprises seven light emitting diodes (segments) whose cathodes has been electrically coupled together. The anodes of the diodes are electrically coupled to drive unit 124 via seven conductors for receiving energization signals. The anode connections for corresponding segments in all indicators are connected together so that energization signals from the drive unit are transmitted to corresponding segments in each of the five indicators. Only the segment of the indicator activated by a signal at its cathode will light up, however.

Figure 6:
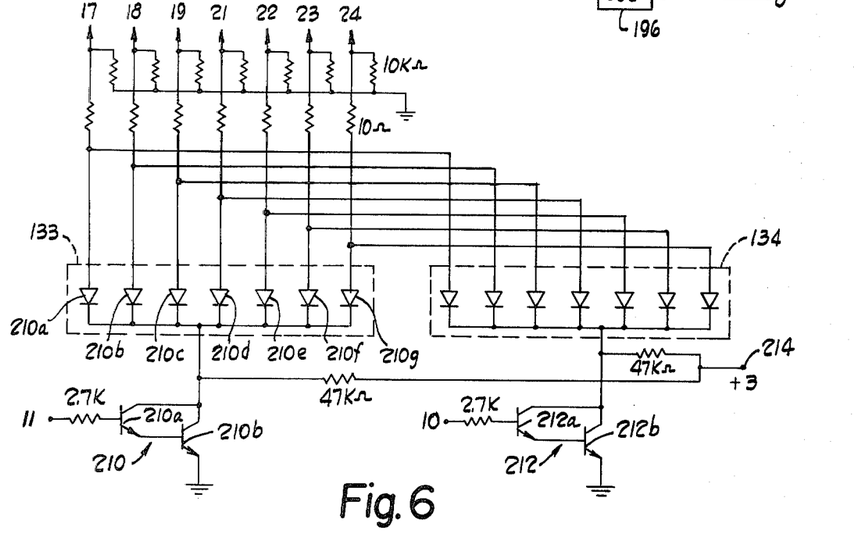
FIG. 6 shows a portion of the display unit.

FIG. 6 illustrates two of the five indicators 133, 134 of display unit 126 coupled to a series of segment energization output pins on the segment driver 192 of drive unit 124. The other indicators forming the display unit are similarly connected to the segment driver output pins. Also illustrated in FIG. 6 are two amplifier circuits 210, 212 which form a portion of the coupling circuit 136. The LED's comprising indicator 134 have their cathodes tied together and to amplifier circuit 212 while the cathodes in indicator 133 are coupled to amplifier 210. Each amplifier circuit 210, 212 includes two transistors connected as a Darlington pair and has a base input coupled to a digit activation output pin on the drive unit. Amplifier 212 for example, has its input connected to output pin 10.

The LED's (segments) comprising a particular indicator illuminate upon receipt of signals from segment driven 192 only when the amplifier coupled to the LED cathodes is turned on by a signal from digit enable unit 194.

As mentioned above, in the normal, free running operation controlled by a signal at pin 8, drive unit 124 sequentially activates the indicators of the display unit and presents appropriate segment energization signals to them. When a particular indicator's segments are to be verified, however, a signal at drive unit pin 8 inhibits oscillator 196 and disrupts the free running mode of drive unit operation so that only one indicator is activated for a time period sufficient to enable the control unit to verify its operation.

Two remaining portions of the system are the segment status determining circuit 128 and the activated indicator encoder 218. The status determining circuit 128 generates signals indicating the status, (on or off) of segments in the activated indicator. These signals are transmitted to control unit 122 at input port 47 and stored in memory for comparison with data indicative of status signals which should be produced if the indicator is properly functioning.

The activated indicator encoder transmits a three bit code to control unit 122 to indicate which of the five indicators is activated. The control unit 122 must know what indicator is activated since only an activated indicator causes segment status data to be transmitted from status determining unit 128.

The encoder 218 comprises six comparator amplifiers 220-225. Each comparator has two inputs, an inverting reference input and a noninverting test input. The comparators may be National Semiconductor Model No. LM339A voltage comparators.

A first comparator 220 has its noninverting input maintained at a voltage of approximately 1.6 volts by action of the voltage divider 216. Comparator 220 also has an inverting input connected to the common cathode connection of the least significant indicator 134. When least significant indicator 134 is activated by operation of drive unit 124, the common cathode is maintained at a voltage of approximately 1 volt or the voltage drop across its forward biased coupling amplifier 212 (FIG. 6). The exact value of this voltage reading is unimportant so long as it is less than the 1.6 volts maintained on the non-inverting input to comparator 220. With the input levels described, the output from comparator 220 is maintained at a high level of approximately 5 volts. This 5 volt output, in conjunction with a 5 volt supply voltage 228 produces a 5 volt input to each of the inverting inputs of the remaining 5 encoder comparators 221-225. This 5 volt input is greater than the voltage appearing on the noninverting inputs to the comparators since those inputs are coupled to the common cathodes of nonactuated indicators. The five volt level on the inverting inputs to the five comparators 221-225 thus result in low level outputs from these 5 comparators. Under these circumstances the three inputs to the control unit 122 will be maintained at approximately zero volts indicating to the control unit that the least significant indicator 134 is at that time activated.

When the least significant indicator 134 is not activated, the output from comparator 220 is at a low or zero volt value. A second voltage divider 230 then provides a voltage of approximately 2 volts to the inverting inputs of the remainder of the comparators 221-225. Under this condition the outputs of the remaining comparators are determined by the voltages appearing on their noninverting inputs which are coupled to the common cathodes of the remaining indicators.

As an example, when the most significant indicator 130 is actuated and the remaining indicators 131-134 in the display are not actuated, the cathodes of the most significant indicator are at approximately 1 volt values. Under this condition the noninverting inputs to four of the five comparators 221-224 are held at three volts and the output from these comparators is at a high or plus level. The remaining comparator 225 has its noninverting input held at approximately 1 volts and therefore produces a zero or low output.

These outputs from these comparators indicate to the control unit that the most significant indicator now has LED's which are being energized and illuminated under control of the drive unit. When the most significant indicator is actuated the inputs on ports P44 and P45 are at a plus 1 or high state and the input on port P46 is low. A unique set of coded inputs is provided to the three pins to indicate drive unit activation of each of the five indicators forming the display unit. In this way control unit 122 can properly correlate each indicators's status signals from the segment status determining circuit 128 with verification data stored in control unit memory.

The status determining circuit 128 comprises an analog switch 232 and a voltage discriminator 234. In combination the switch and voltage discriminator cause a series of seven segment status indicating signals to be transmitted to the control unit 122 for each indicator. These status signals are indicative of the operating condition of each of the seven light emitting diodes forming an actuated indicator.

The analog switch 232 includes a set of three address inputs 236-238 and a second set of seven anode voltage inputs 240a-g as well as one output 242 for transmitting anode voltage signals to the voltage discriminator. The address inputs 236-238 to the analog switch determine which of the seven anode voltage inputs is transmitted to voltage discriminator 234. Under control of control unit 122, the address inputs 236-238 are sequentially varied to cause transmission in turn of the segment anode voltages from the seven light emitting diodes comprising an actuated indicator.

The voltage discriminator 234 produces one of two outputs. If its input from analog switch 232 is a voltage between the values of 4.1 and 2.0 volts a plus or high output is generated and transmitted to port 47 on control unit 122 indicating that the segment represented by the input voltage to the analog switch in on. Any other voltage value will result in a zero or low input to that port on the control unit. To accomplish this function the discriminator comprises two voltage comparators each of which has a reference input connected to a voltage divider 216. A first comparator receives a reference input of approximately 4.1 volts and the second comparator receives a reference input of approximately 2.0 volts.

The reference inputs to the voltage discriminator are empirically derived values based upon operating characteristics of the display unit. It is determined from testing that if a particular LED in the display is properly coupled to the 5 volts energization voltage from the drive unit and is properly carrying current and therefore emitting light, the voltage drop from the anode through the coupling circuit to ground will be somewhere between 2.0 and 4.1 volts. An input voltage to discriminator 234 in this range causes the discriminator to transmit a high or 5 volt input to control unit 122 at pin 47. If an open circuit exists and the LED is not connected to the drive unit an input of greater than 4.1 volts will be transmitted to the voltage discriminator and a zero input will be transmitted to pin 47 on the control unit. A zero volt input to an LED anode corresponding to a nonenergized LED will cause a zero volt input to be transmitted to the discriminator input and again a zero or low level reading will be input on control unit pin p47. In this way, the segment status determining circuit provides to control unit 122 status signals indicative of the actual operating condition of each LED comprising the display unit. Only one discriminator 234 is necessary since analog switch 232 serves to selectively transmit all seven anode voltages indicative of the operating status of each of the seven LED's comprising an indicator.

The detailed operation of the system will be described with reference to the flow sheets of FIGS. 7A to 7D.

In this flow diagram certain conventions have been followed which will be familiar to those skilled in the art. A rectangle is used to identify an operation step within the program. A trapezoid is used whenever information or data will be output from or input to the microprocessor. A diamond is used to identify decision making steps within the verification process. Any time a decision making step is included a branch may occur within the program. Depending upon the status of various registers within the program the branch can occur in either of two directions and the branching options available to the program are defined by use of circular branch designations. A 3870 microprocessor assembly language program listing in accordance with this flow diagram has been appended to this application. The program labels such as MCYC (See flow chart step 316) on the program correspond to labeled steps of the flow chart.

A first step 310 (FIG. 7A) in the segment verification process is to power up the microprocessor by applying a power supply voltage at pin 40 of the microprocessor. Referring to steps 312 and 314 of the flow chart, the microprocessor program then clears all 64 scratch pad registers. At the completion of these steps the accumulator register bits are all zero and input and output ports 0, 1, and 6 are loaded with zeros.

Figure 8:
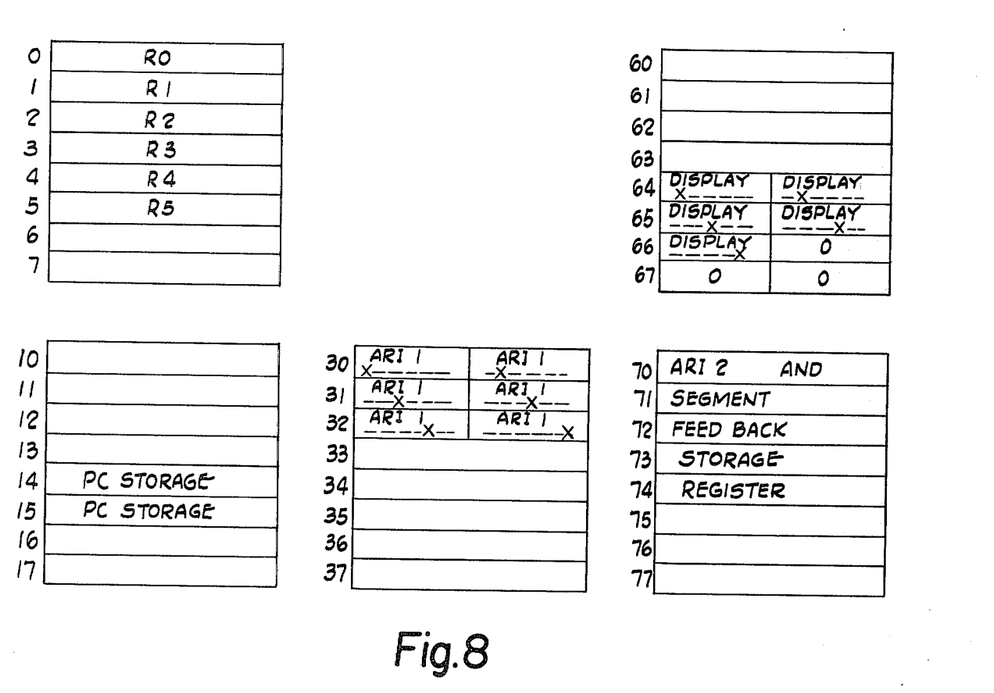
FIG. 8 is a memory map showing the contents of certain control unit memory registers.

As noted previously the ISAR register 150 (FIG. 4) contains the two digit octal addresses of the scratch pad registers. FIG. 8 depicts the scratch pad registers in the form of a "memory map" with octal addresses. As the various registers are loaded with data the memory map will be referred to and contents of particular memory locations (identified by octal address) will be examined.

Figure 7A:
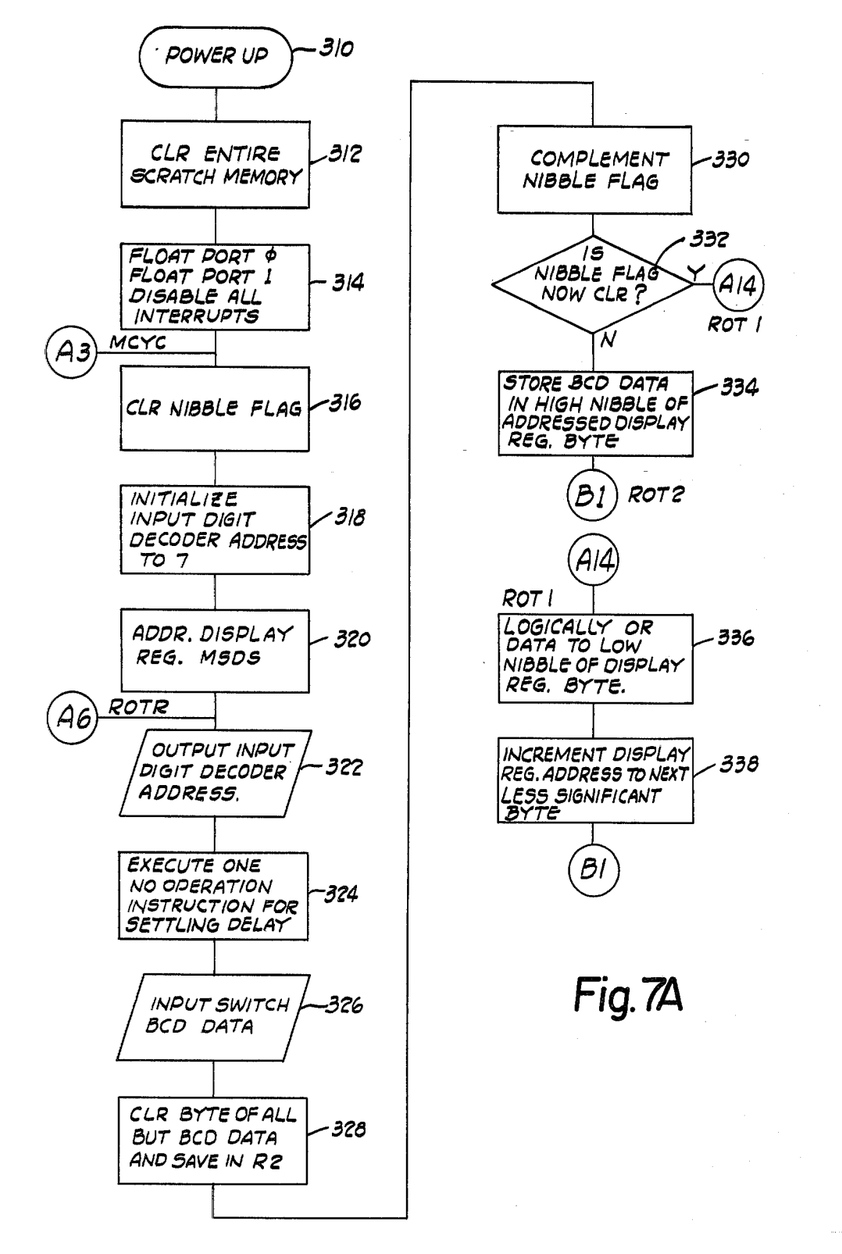
FIGS. 7A-7D are a detailed flow chart of the steps performed in the display verification.

The segment verification cycle of the program begins at step 316 when scratch pad register R0 is cleared. Scratch pad register R1 is then initialized to 7 and the ISAR register to 64 at steps 318 and 320, respectively.

As data is loaded into the microprocessor (even numbered steps 322 through 344 in the flow chart), registers R0 and R1 serve as counters and the ISAR register contents determine in which scratch pad register data from the data source 170 is to be stored. Functioning of the counter registers (R0 and R1) will become clear as the process of inputting data into the microprocessor is explained.

In steps 322 through 344 (shown in FIGS. 7A and 7B) numerical data is progressively accessed from the rotary switches of data source 170 and stored in the microprocessor. This process is begun with step 322 in which the contents of scratch pad register R1 are output through port 5. The lowest three bits from port 5 (P50, P51, P52) are inputs to the decoder 172 and therefore the three low order bit contents of R1 are input to that decoder. In a first cycle or loop within the data storing process scratch pad register R1 contains the number 7 since it was initialized to that value in step 318.

Because the input and output pins on the 3870 microprocessor are logically inverted the 7 becomes a 0. This 0 (lows on all decoder input pins) produces a low condition on the decoded zero output of decoder 172. This condition causes the switch that is connected to the decoded zero output to input a number to the encoder 174.

By outputting other address values from port 5, the microprocessor sequentially accesses different switches whose settings are input to the encoder 174. The BCD data generated by encoder 174 is transmitted to the microprocessor accumulator and stored in microprocessor memory. Steps 322 to 326 in the flow chart illustrate the sequence of outputting an address to encoder 172, waiting for this address to produce data in decoder 174, and inputting this data from the decoder to the microprocessor.

Once the BCD data has been input into the microprocessor accumulator (see step 326 in flow chart) it is sorted within the microprocessor scratch pad register R2 as shown in step 328. This BCD data is input on pins P53, P54, P55 and p56 of input port 5 and shifted into the four least significant bits in the accumulator. The data is then stored in scratch pad register R2 and logic steps are performed to determine how that data is to be stored in memory.

The step in block 330 causes the contents of the scratch pad register R0 to be complemented. In the first pass through this portion of the program, the contents of R0 will be complemented to all 1's. At step 332, therefore, no branch can occur and step 334 will next be performed. In this step, data within scratch pad register R2 is stored in the high order positions of the register addressed by the ISAR register (on the first pass register R64). At steps 340 and 342 the contents of decoder address register R1 are decremented and then compared to 2. If R1 contents are equal to 2 then all five digital data values have been stored in the microprocessor and the program proceeds to step 344.

If all five data values have not been stored within the microprocessor scratch pad registers, the program will branch back to step 322 where the contents of register R1 are again output to decoder 172 and the succeeding steps are repeated. At step 332 in this second pass through the loop complemented R0 register is clear so the program will branch to step 336 and the data value stored in register R2 loaded into the low order positions of scratch pad register R64. When this step has been completed the program has loaded two BCD digits within register R64. The four higher order bits of register R64 contain BCD data corresponding to one digit and the low four bits BCD data corresponding to a second digit.

At step 338, the contents of the ISAR register are incremented so that it now addresses scratch pad register R65. The next digit will then be stored in the high order bit positions of R65 as the storing process continues.

The looping described above continues until a "yes" is obtained at step 342 and five digits are stored in memory registers R64 through R66 as shown in the memory map of FIG. 8. A decimal digit corresponding to the BCD data in the high order bits of scratch pad register R64 will be displayed by the most significant indicator 130 in the display unit and the remaining data in indicators 131-134 are in the sequence indicated in the memory map.

Step 346 (FIG. 7B) begins a display routine in which the data values stored within the microprocessor are displayed and verified by the system. Since drive unit 124 contains its own memory the display routine begins with a transmittal of the BCD data contained in scratch pad registers 64 through 66 to the drive unit for storage.

Figure 7B:
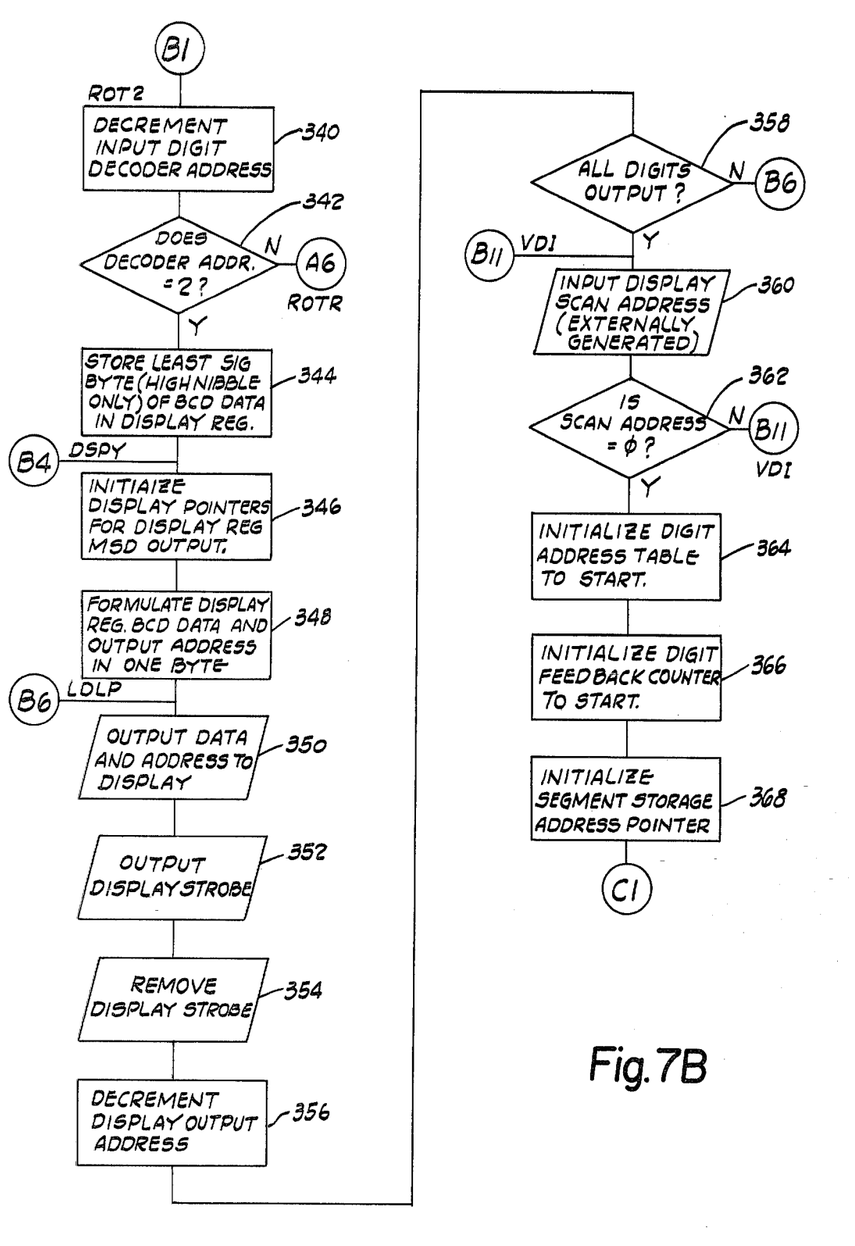

At steps 346 and 348, certain bookkeeping functions are performed by loading registers R1 and R2 with certain constants. Thus, register R1 is loaded with octal 67 and register R2 is loaded with octal 73. A subroutine is then executed in which the contents of registers R64 through R67 are moved to registers R70 through R73 (see memory map). The subroutine is labeled "mov4" in the attached program listing and uses the contents of the scratch pad register R1 as a destination register and the contents of register R2 as a source. Thus, the previous steps in which registers R1 and R2 were loaded with constants 67 and 73 dictate the source and destination memory locations for this data movement. Once the display data has been stored in registers R70 through R73 it is ready to be transmitted to the drive unit in steps 350-358 of the flow chart.

As a first step a display digit address register R0 is initialized to 5. As the display digits are loaded into the display driver this address is decremented from 5 to 0.

It should be recalled that the drive unit contains six storage registers 186-191 for storing six BCD display data values which the scratch pad registers contain only five data values. To accommodate this mismatch, "dummy data" is formulated by the program and loaded into the most significant digit or "extra" register in the drive unit on the first pass through steps 350-358 in the flow chart.

Once the "extra" register in the drive unit 124 has been loaded with "dummy" data via steps 350 to 358, the program again loops through the subroutine labeled LDLP (steps 350-358) and beings the process of transmitting display data into the remaining five registers of the drive unit. As the LDLP routine is executed the drive unit storage register address and its intended contents are assembled in the accumulator and transmitted to the drive unit. At steps 356 and 358 of the flow chart, the digit address is decremented and checked and if not zero the process of outputting display data is continued until BDC data corresponding to all display digits have been stored within the drive unit. This process is completed when the digit address register RO has been counted down from five through zero and data corresponding to one "dummy" and five display digits are stored in the drive unit's six storage registers.

The process of segment verification begins with the routine VDI at step 360 in the flow chart. During the verification process, data stored in the drive unit causes the segment driver 192 to energize appropriate segments on each of the five indicators comprising the display unit. As mentioned above, in normal operation the drive unit is free running and sequentially actuates each of the indicators within the display unit 126. An appropriate signal at pin 8 of oscillator 196 disables the scanning feature and "freezes" the display at the actuated indicator. During either the free running or static display mode the logic encoder 218 provides to the microprocessor the address of the actuated indicator. Stored in microprocessor ROM memory 144 is a table listing the addresses of the five indicators 130–134.

At steps 360 and 362, the microprocessor reads from encoder 128 the address of the actuated indicator 130–134 and determines if it is the least significant indicator 134. If it is not, more data is input (step 360) until the free running mode of drive unit operation causes indicator 134 to be actuated. After that determination is made, at step 364 the data counter is initialized to the ROM address of the beginning of the table of indicator addresses. At steps 366 and 368 a digit counter is initialized to five and the ISAR register addresses scratch pad register 74. At this point the microprocessor is prepared to receive status signals corresponding to the operating condition of each display segment and to store a set of these status signals in scratch pad registers 74–70 for each of the five display unit indicators 130–134.

Figure 7C:
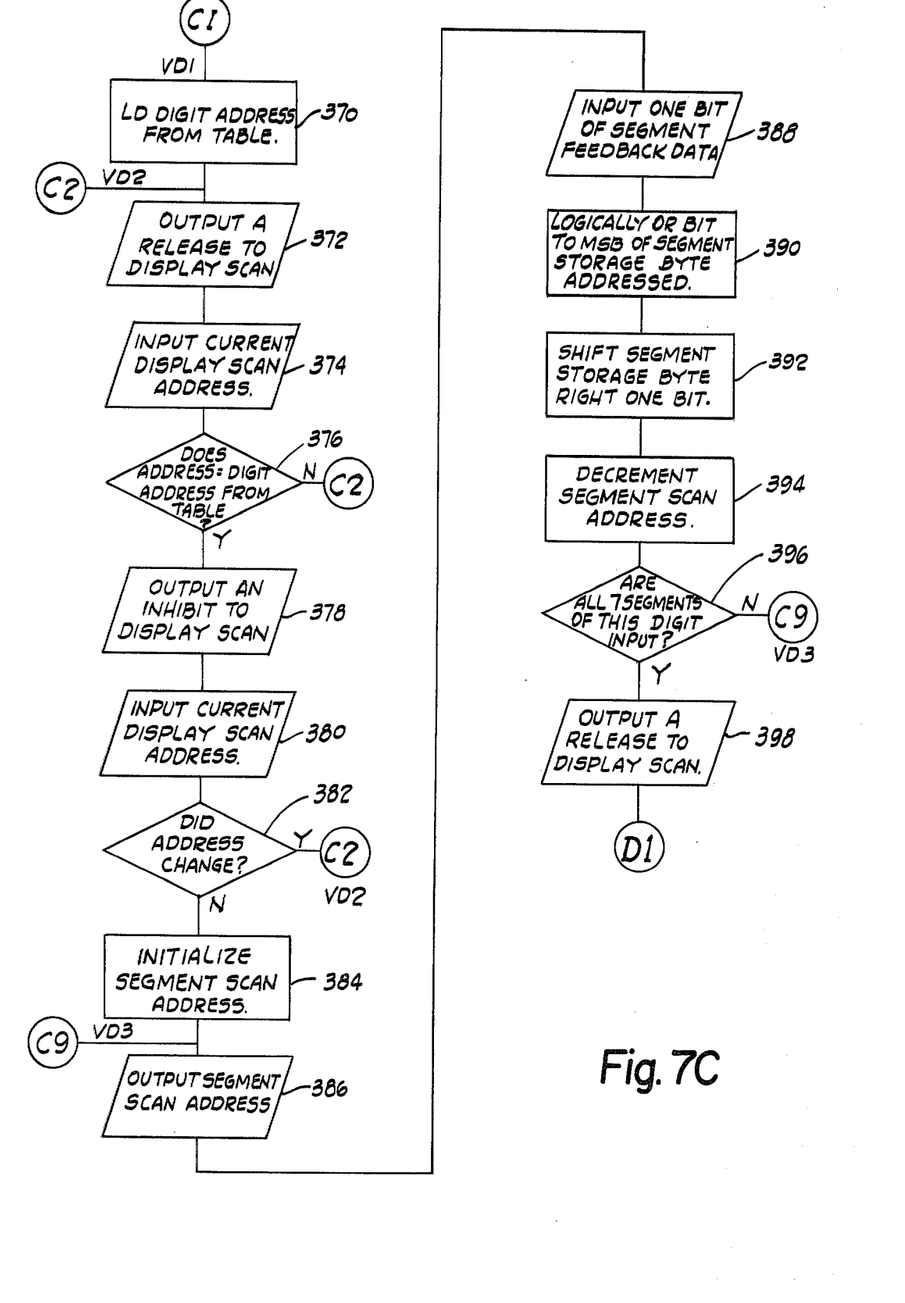

At step 370 of the flow chart, the first indicator address is loaded from the ROM table into scratch pad register RO. At step 372 a release (signal) is provided on port 43 of the microprocessor causing the drive unit 124 to return to the free running mode. When this step is first executed the drive unit is already free running but on later executions of this step it is necessary to re-activate the free running mode of drive unit operation.

Indicator address data from encoder 218 is input to the microprocessor at step 374. This address is compared at step 376 of the flow chart with the address from the data table previously loaded into scratch pad register RO. During a first loop through the program an address of hexadecimal "40" for the most significant indicator is accessed from the data table. If the address from encoder 218 is the same, a display driver inhibit step 378 is executed. This step stops the free running of drive unit 124 by sending an appropriate signal to oscillator 196.

If the address from encoder 128 is not that of the most significant indicator, a program branch occurs sending the program back to step 372 to release the drive unit 124 into a free running mode. This causes drive unit 124 to again sequentially activate the five indicators in the display unit as the microprocessor again compares addresses from the encoder 218 to the addresses from the ROM data table. Eventually the two will be equal and an inhibit signal will be sent to the drive unit causing it to stop its free running mode of operation.

Once the display indicator address has been verified (step 376 of the flow chart) and the free running mode of drive unit operation has been inhibited (step 378) the indicator address from encoder 218 is again checked at steps 380, 382 to see that it corresponds to the address from the ROM table. This is done to assure that while the inhibit is sent to the drive unit no changes in indicator actuation have occurred. If this rechecking confirms the equality of the two addresses the microprocessor begins to check the status of each segment comprising the activated indicator. If, however, the two address are not the same, then the microprocessor again branches to a routine (VD2 in the flow chart) where the activated indicator address is scanned during the free running mode of drive unit operation until it corresponds to the address from the ROM data table.

The segment status verification process begins at step 384 where scratch pad register R3 is initialized to six which is the address of the first segment to have its status determined. The segment address information is scratch pad register R3 is sent to analog switch 232 of status determining circuit 128 (FIG. 3).

The anode voltage on the addressed segment is transmitted through analog switch 232 to discriminator 234. In the case of segment No. 6 being addressed, it is segment "g" of the activated indicator which has its status determined by status determining circuit 128 in the manner described above.

At step 388 of the flow chart the status indicating signal for the addressed segment is input to the microprocessor from the voltage discriminator 234. This status indicating bit is then stored in a scratch pad register as addressed by the ISAR register. While the seven segments for the most significant indicator 130 are being verified, the status data is stored in scratch pad register R74. As the other indicators are checked the status bits for the segments of the respective indicators are stored in scratch pad registers 73 through 70.

Steps 386 to 396 are repeated for each segment of the addressed indicator. As the segment address is decremented from six to zero the status of each segment is stored in the addressed scratch pad register. The status of segment "g" comprises the least significant bit in that register and the status of segment "a" the seventh most significant bit. Operation of the computer program (See Appendix) results in the eighth most significant bit position always containing a zero.

As shown in step 398, when the status of all seven segments comprising an addressed indicator have been stored (step 396) in the microprocessor memory a release is sent to the drive unit 124 allowing it to sequentially activate each of the five indicators. The ISAR register and scratch pad register R1 are decremented as shown at steps 400 and 402. It should be recalled that scratch pad register R1 originally contained a "5" and after this step will contain a "4". The ISAR register after decrementing contains the number 73 and therefore will next address scratch pad register 73 when status data is being stored during the verification process.

At step 404 in the flow chart the microprocessor determines if status indicating signals for all indicators have been obtained and stored. If not, the program branches back to step 370 where the process of comparing indicator address information from encoder 218 with indicator address information stored in memory is again begun. The process of segment status scanning continues indicator by indicator until status data for all segments of all five indicators forming display unit 126 have been stored in scratch pad registers 70 through 74.

It will be apparent to those skilled in the art that the contents of scratch pad registers 70 through 74 are not binary coded representations of the numbers displayed by display unit 126. Instead, the first seven bits in each register correspond to the status of indicator segments g through a, respectively, with the eighth bit always being a zero.

A specific example of this stored status data follows. If the most significant indicator 130 is to display the number "1", only segments "b" and "c" of that indicator should be illuminated. As status signals for the segments are generated by discriminator 234, therefore, segments "a", "d", "e", "f" and "g" should be off and cause the discriminator to produce a zero output. Segments "b" and "c" should each produce a one or high level output. These status signals are automatically complemented by the inverse logic of the microprocessor so that scratch pad register 74 (status data for the most significant indicator is stored in scratch pad register 74) should contain a one in its four lowest significant bits, zero in its fifth and sixth bits, a one in its seventh bit and zero in its eight bit.

Figure 7D:
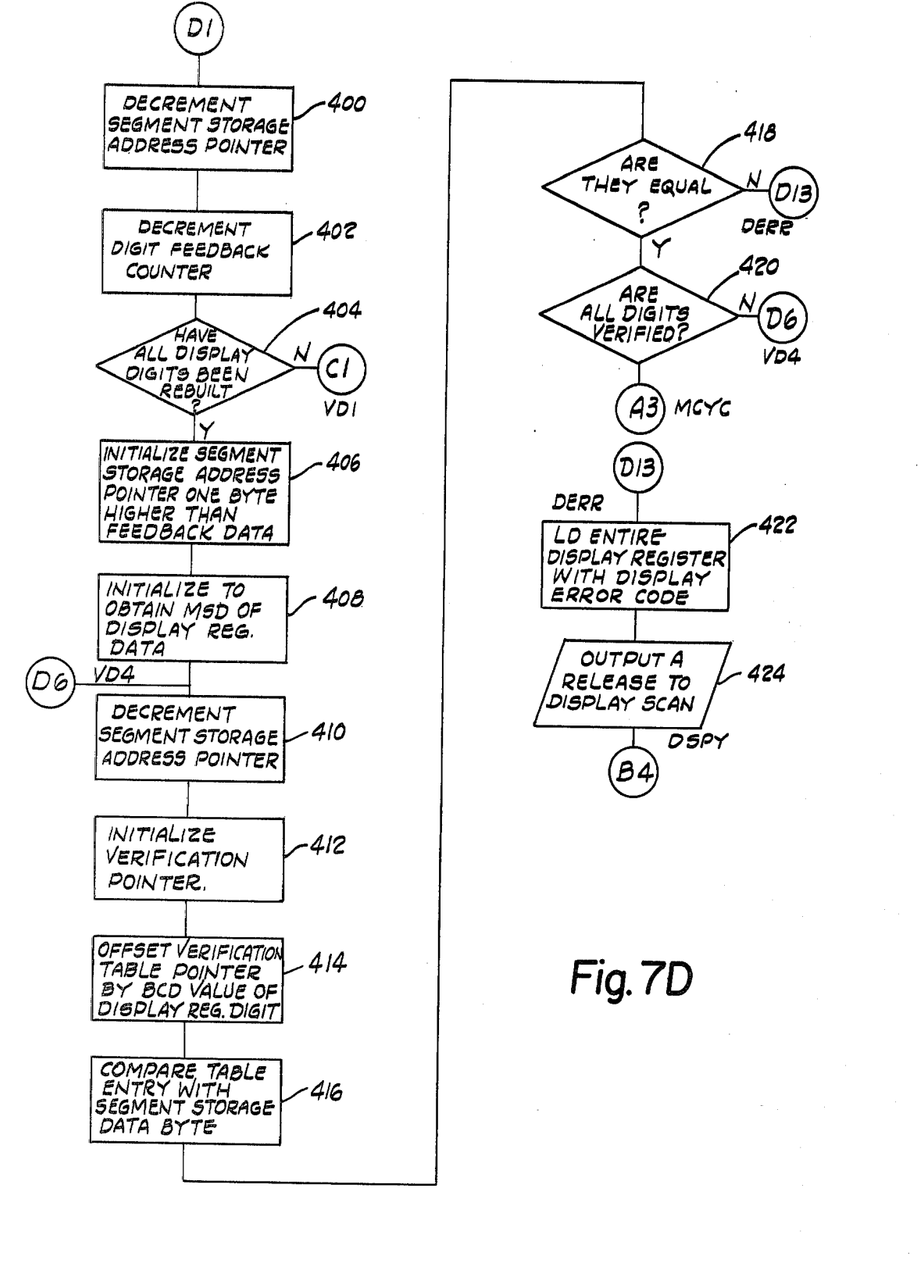

Thus, for each of the possible digits displayed on an indicator 130-134 a unique sequence of bits will be stored in an appropriate scratch pad register. After all segments status information has been stored in this manner, the next two steps 406, 408 in the flow chart initialize scratch pad register R3 to octal 75 and scratch pad register R1 to octal 67. A subroutine label "MVA1" then moves the contents of scratch pad registered 67 through 64 (display information from data source 170, see FIG. 8) to scratch pad registers 33 through 30.

At step 410, scratch pad register R3 is decremented to octal 74. The ISAR register is then loaded with the number 33 and the subroutine "LSFT" is executed. This subroutine takes the most significant BCD digit from scratch pad registers 33 through 30 and stores it in scratch pad register R2. It also shifts the remaining digits one position (four bits) to the left in scratch pad registers 30 through 33. Thus, after "LSFT" is executed one time, the second most significant digit which originally was stored in the lower four bits of scratch pad register 30 will appear in the highest four bits of scratch pad register 30. Similarly, other bits comprising the display data will be shifted four bits from their original position.

Once BCD data corresponding to the digit which should be displayed by the most significant indicator 130 has been stored in scratch pad register R2, the microprocessor performs at steps 412-418 a comparison of segment status data with display data from data source 170. At step 412 a data counter (DC) register is initialized to a first register address of a ROM data table similar to the table utilized earlier for storing indicator addresses.

This second data table comprises a number of eight bit bytes each containing a set of correct segment status bits for the numbers 0 to 9. The first byte in the table contains a set of status bits which should be generated if a zero is displayed on an indicator 130-134 of the display unit. Subsequent bytes contain sets of status bits corresponding to the numbers 1 through 9. At step 412 of the flow chart the microprocessor data counter is initialized to the address of the data table byte containing a set of segment status bits corresponding to the number 0.

At step 414, the data counter which was initialized at step 412 is offset by an amount equal to the contents of scratch pad register R2. It should be recalled that at this point scratch pad register R2 contains in BCD format the number which should have been displayed by the most significant indicator 130 of the display unit. Thus, during a first execution of step 414 the data counter (DC) register is offset by a number of ROM address locations equal to the number input from data source 170 to be displayed by the most significant indicator 130.

At steps 416 and 418, the contents of the data table register addressed by the offset data counter (DC) register are compared with the byte of segment status bits (scratch pad register 74) obtained from the most significant indicator 130. If equality exists between the bits comprising these two bytes, display data has been properly transmitted from the control unit 122 to drive unit 124, displayed correctly on the display unit, and the correctness of the transmission and display verified. A non-equality in these bits means that a malfunction has occurred either in the circuitry or in the segments comprising the most significant indicator.

The example discussed above regarding the status bits stored when the number "one" is displayed help to demonstrate steps 416 to 418. As described above, the number "one", when properly displayed, results in the storage in a scratch pad register (register 74 for the most significant indicator) of ones in the four low order bits, a zero in the fifth and sixth order bits, a one in the seventh order bit and a zero in the eighth bit. If this status information is interpreted as hexadecimal codes, the high four significant bits (i.e. 0100) represent hexadecimal 4 and the lower four order bits (i.e. 1111) represent hexadecimal F. In observing the verification data table on the appended program listing (line 0065) it should be noted that the first and second bytes in the data table contain the hexadecimal representations 01 and 4F respectively. In the comment section to the right of the hexadecimal numbers is found the two digits zero and one. This comment indicates that the hexadecimal "01" corresponds to the segment status bit contents of a scratch pad register loaded in response to a properly displayed "zero" on an indicator 130-134 and the hexadecimal representation "4F" indicates the scratch pad register status bit contents when a "one" is properly displayed. Other lines of the verification data table indicate the hexadecimal representations of bytes of segment status bits generated in response to the displaying of the other eight digits from 2 to 9.

By offsetting the data counter register (step 414) by an amount equal to the number which should have been displayed (contents of register R2) the data counter addresses the data table byte corresponding to that number. Thus in the example, the data counter (DC) will be offset by one address location when register R2 contains the number in BCD format "one". A shift of one location causes the data counter to address the data table byte containing "4F" which corresponds to the segment status bits which should be stored in response to a properly displayed number "one" on an indicator 130-134. The contents of the addressed byte are then compared at step 416 to the contents of the byte actually stored (in scratch pad register 74 for most significant indicator 130) during the segment status determining process.

If the first comparison (steps 416 to 420) indicates the two numbers are equal, the digit for the most significant indicator 130 has been properly displayed and the program returns to the step 410 to verify the correctness of the display for the next most significant indicator 131. Steps 410 to 420 are repeated for each of the remaining indicators unless a nonequality is found at step 418 before all of the indicators are verified.

If there is a nonequality between the byte stored in ROM and the byte generated during the status determining process, a display error subroutine (DERR) (Decision Step 418) is accessed. The display error subroutine provides a warning to the user that a malfunction in the display has occurred by causing a series of lines to be displayed across the bottoms of the display indicators. This warns the user that the display is no longer functioning properly and may not be relied upon. The fault can then be corrected by maintenance procedures designed to determine which of the segments is no longer functioning properly.

If all segments of the display are properly functioning the program returns to a main cycle routine (MCYC) and repeats the verification procedure.

It will be appreciated by those skilled in the art that other techniques might be utilized to perform the present invention without departing from the scope of the invention. In particular, many of the steps illustrated herein have been adopted for programming convenience and due to the particular requirements of the 3870 microprocessor. Other controllers might also be used to verify the accuracy of the system in the manner embodied by this invention without departing from the scope of the invention.

While the present invention has been described with particularity, it should be understood that various modifications and alterations might be made therein without departing from the spirit or scope of the invention as set forth in the appended claims.

| 0000 | | | | | * 8135 DISPLAY VERIFICATION PROGRAM - 11/28/78 | | |
|------|------|----|----|------|------|--------|---------------------------------|
| 0001 | | | | | ORG | 0 | |
| 0002 | 0000 | 20 | 3F | | LI | O'77' | CLR ENTIRE SCRATCH MEMORY |
| 0003 | 0002 | 50 | | | LR | 0,A | |
| 0004 | 0003 | 40 | | CLRS | LR | A,0 | |
| 0005 | 0004 | 0B | | | LR | IS,A | |
| 0006 | 0005 | 70 | | | CLR | | |
| 0007 | 0006 | 5C | | | LR | S,A | |
| 0008 | 0007 | 30 | | | DS | 0 | |
| 0009 | 0008 | 82 | FA | | BC | CLRS | |
| 000A | 000A | B0 | | | OUTS | 0 | FLOAT PORT 0 |
| 000B | 000B | B1 | | | OUTS | 1 | FLOAT PORT 1 |
| 000C | 000C | B6 | | | OUTS | 6 | DISABLE ALL INTERRUPTS |
| 000D | 000D | 70 | | MCYC | CLR | | MAIN CYCLE |
| 000E | 000E | 50 | | | LR | 0,A | CLR R0 (NIBBLE FLAG) |
| 000F | 000F | 77 | | | LIS | 7 | |
| 0010 | 0010 | 51 | | | LR | 1,A | INIT R1 TO 7 (DECODER ADDR) |
| 0011 | 0011 | 66 | | | LISU | 6 | ADDR DISPLAY WGT REG |
| 0012 | 0012 | 6C | | | LISL | 4 | |
| 0013 | 0013 | 41 | | ROTR | LR | A,1 | ROTARY SW RD,LD DECODER ADDR |
| 0014 | 0014 | B5 | | | OUTS | 5 | OUTPUT |
| 0015 | 0015 | 2B | | | NOP | | |
| 0016 | 0016 | A5 | | | INS | 5 | INPUT SWITCH DATA |
| 0017 | 0017 | 13 | | | SL | 1 | DATA > HIGH NIBBLE |
| 0018 | 0018 | 14 | | | SR | 4 | DATA > LOW NIBBLE |
| 0019 | 0019 | 52 | | | LR | 2,A | SAVE |
| 001A | 001A | 40 | | | LR | A,0 | LD NIBBLE FLAG |
| 001B | 001B | 18 | | | COM | | COMPLEMENT |
| 001C | 001C | 50 | | | LR | 0,A | UPDATE |
| 001D | 001D | 42 | | | LR | A,2 | RE-LD DATA |
| 001E | 001E | 84 | 05 | | BZ | ROT1 | BR NIBBLE FLAG NOW CLR |
| 001F | 0020 | 15 | | | SL | 4 | NOW SET:DATA > HIGH NIBBLE |
| 0020 | 0021 | 5C | | | LR | S,A | STORE |
| 0021 | 0022 | 90 | 03 | | BR | ROT2 | |
| 0022 | 0024 | EC | | ROT1 | XS | S | .OR. WITH LOW NIBBLE |
| 0023 | 0025 | 5D | | | LR | I,A | STORE 2 DIGITS,INCR ISAR |
| 0024 | 0026 | 31 | | ROT2 | DS | 1 | DECR DECODER ADDR |
| 0025 | 0027 | 72 | | | LIS | 2 | |
| 0026 | 0028 | E1 | | | XS | 1 | CK DECODER ADDR = 2 |
| 0027 | 0029 | 94 | E9 | | BNZ | ROTR | BR NOT YET 2 |
| 0028 | 002B | 6F | | | LISL | 7 | |
| 0029 | 002C | 5C | | | LR | S,A | STORE LSD OF ROTARY SW DATA |
| 002A | 002D | 20 | 37 | DSPY | LI | O'67' | |
| 002B | 002F | 51 | | | LR | 1,A | |
| 002C | 0030 | 20 | 3B | | LI | O'73' | |
| 002D | 0032 | 52 | | | LR | 2,A | |
| 002E | 0033 | 28 | 00 A6 | | PI | MOV4 | MOVE DISPLAY WGT TO ARI2 |
| 002F | 0036 | 75 | | | LIS | 5 | |
| 0030 | 0037 | 50 | | | LR | 0,A | INIT DIGIT ADDR TO 5 |
| 0031 | 0038 | 20 | 5F | | LI | H'5F' | LD ADDR 5,DATA BLANK |
| 0032 | 003A | 90 | 09 | | BR | DSP3 | GO OUTPUT |
| 0033 | 003C | 67 | | LDLP | LISU | 7 | LOAD DISPLAY LOOP |
| 0034 | 003D | 6A | | | LISL | 2 | ADDR LSDS IN ARI2 |
| 0035 | 003E | 28 | 00 D2 | | PI | LSFT | SHIFT LEFT,CUR MSD IN R2 |
| 0036 | 0041 | 40 | | | LR | A,0 | LD DIGIT ADDR |
| 0037 | 0042 | 15 | | | SL | 4 | SHIFT TO HIGH NIBBLE |
| 0038 | 0043 | C2 | | | AS | 2 | ADD DIGIT DATA |
| 0039 | 0044 | 18 | | DSP3 | COM | | .COM.FOR OUTPUT |
| 003A | 0045 | B1 | | | OUTS | 1 | OUTPUT DATA,ADDR, |
| 003B | 0046 | 7F | | | LIS | 15 | |
| 003C | 0047 | B4 | | | OUTS | 4 | OUTPUT STROBE |
| 003D | 0048 | 20 | 0D | | LI | 13 | |
| 003E | 004A | B4 | | | OUTS | 4 | REMOVE STROBE |
| 003F | 004B | 30 | | | DS | 0 | DECR DIGIT ADDR |
| 0040 | 004C | 82 | EF | | BC | LDLP | LOOP NO BORROW |
| 0041 | 004E | A4 | | VDI | INS | 4 | INIT DISPLAY VFY:INPUT CUR |
| 0042 | 004F | 21 | 70 | | NI | H'70' | DISPLAY ADDR,LEAVE ONLY ADDR |
| 0043 | 0051 | 23 | 70 | | XI | H'70' | WAIT FOR ADDR 0 |
| 0044 | 0053 | 94 | FA | | BNZ | VDI | LOOP NOT ADDR 0 |

-continued

| | | | | | | | |
|---|---|---|---|---|---|---|---|
| 0045 | 0055 | 67 | | | LISU | 7 | |
| 0046 | 0056 | 6D | | | LISL | 5 | |
| 0047 | 0057 | 5E | | | LR | D,A | CLR SEGMENT STORAGE |
| 0048 | 0058 | 8F | FE | | BR7 | *−1 | |
| 0049 | 005A | 2A | 00 | DF | DCI | DTAB | INIT DC0 TO DIGIT ADDR TABLE |
| 004A | 005D | 75 | | | LIS | 5 | |
| 004B | 005E | 51 | | | LR | 1,A | INIT DIGIT FEEDBACK CNTR TO 5 |
| 004C | 005F | 6C | | VD0 | LISL | 4 | INIT ISAR TO 74 |
| 004D | 0060 | 16 | | VD1 | LM | | LD ADDR |
| 004E | 0061 | 50 | | | LR | 0,A | SAVE IN R0 |
| 004F | 0062 | 7D | | VD2 | LIS | 13 | |
| 0050 | 0063 | B4 | | | OUTS | 4 | RELEASE DISPLAY SCAN |
| 0051 | 0064 | A4 | | | INS | 4 | INPUT CURRENT DISPLAY ADDR |
| 0052 | 0065 | 21 | 70 | | NI | H'70' | LEAVE ONLY ADDR |
| 0053 | 0067 | E0 | | | XS | 0 | CK AGAINST TABLE ADDR |
| 0054 | 0068 | 94 | F9 | | BNZ | VD2 | LOOP NOT SAME |
| 0055 | 006A | 75 | | | LIS | 5 | |
| 0056 | 006B | B4 | | | OUTS | 4 | OUTPUT DISPLAY SCAN INHIBIT |
| 0057 | 006C | A4 | | | INS | 4 | INPUT CURRENT DISPLAY ADDR |
| 0058 | 006D | 21 | 70 | | NI | H'70' | LEAVE ONLY ADDR |
| 0059 | 006F | E0 | | | XS | 0 | CK AGAINST TABLE ADDR |
| 005A | 0070 | 94 | F1 | | BNZ | VD2 | BR IF LOST IT:AWAIT NEXT CYCLE |
| 005B | 0072 | 76 | | | LIS | 6 | |
| 005C | 0073 | 53 | | | LR | 3,A | INIT SEGMENT SCAN ADDR TO 6 |
| 005D | 0074 | 43 | | VD3 | LR | A,3 | LD SEGMENT SCAN ADDR |
| 005E | 0075 | 15 | | | SL | 4 | |
| 005F | 0076 | 18 | | | COM | | |
| 0060 | 0077 | B1 | | | OUTS | 1 | OUTPUT ADDR |
| 0061 | 0078 | A4 | | | INS | 4 | INPUT SEGMENT FEEDBACK DATA |
| 0062 | 0079 | 21 | 80 | | NI | H'80' | LEAVE ONLY DATA |
| 0063 | 007B | EC | | | XS | S | .OR.TO DIGIT FEEDBACK BYTE |
| 0064 | 007C | 12 | | | SR | 1 | SHIFT BYTE RIGHT |
| 0065 | 007D | 5C | | | LR | S,A | UPDATE |
| 0066 | 007E | 33 | | | DS | 3 | DECR SEGMENT SCAN ADDR |
| 0067 | 007F | 82 | F4 | | BC | VD3 | LOOP NOT DONE WITH DIGIT |
| 0068 | 0081 | 7D | | | LIS | 13 | |
| 0069 | 0082 | B4 | | | OUTS | 4 | RELEASE DISPLAY SCAN |
| 006A | 0083 | 4E | | | LR | A,D | DECR ISAR |
| 006B | 0084 | 31 | | | DS | 1 | DECR DIGIT FEEDBACK COUNTER |
| 006C | 0085 | 94 | DA | | BNZ | VD1 | LOOP ALL DIGITS NOT DONE |
| 006D | 0087 | 20 | 3D | | LI | O'75' | |
| 006E | 0089 | 53 | | | LR | 3,A | INIT DIGIT FEEDBACK ADDR |
| 006F | 008A | 20 | 37 | | LI | O'67' | |
| 0070 | 008C | 51 | | | LR | 1,A | |
| 0071 | 008D | 28 | 00 | B9 | PI | MVA1 | MOVE DISPLAY WGT TO ARI1 |
| 0072 | 0090 | 33 | | VD4 | DS | 3 | DECR SEG DATA ADDR |
| 0073 | 0091 | 63 | | | LISU | 3 | |
| 0074 | 0092 | 6B | | | LISL | 3 | |
| 0075 | 0093 | 28 | 00 | D2 | PI | LSFT | DISPLAY WGT DIGIT > R2 |
| 0076 | 0096 | 2A | 00 | E4 | DCI | VTAB | INIT DC0 TO VERIFICATION TABLE |
| 0077 | 0099 | 43 | | | LR | A,3 | |
| 0078 | 009A | 0B | | | LR | IS,A | SEGMENT DATA ADDR > ISAR |
| 0079 | 009B | 42 | | | LR | A,2 | LD DISPLAY WGT DIGIT |
| 007A | 009C | 8E | | | ADC | | OFFSET DC0 POINTER |
| 007B | 009D | 4E | | | LR | A,D | LD SEGMENT DATA |
| 007C | 009E | 8D | | | CM | | COMPARE WITH TABLE ENTRY |
| 007D | 009F | 94 | 54 | | BNZ | DERR | BR NOT SAME:DISPLAY ERROR |
| 007E | 00A1 | 8F | EE | | BR7 | VD4 | BR NOT DONE |
| 007F | 00A3 | 29 | 00 | 0D | MCLK JMP | MCYC | GO TO MAIN CYCLE |
| 0080 | | | | | * MOV4 SUBROUTINE - MOVES 4 BYTES FROM SOURCE ISAR | | |
| 0081 | | | | | * IN R1 (HIGH BYTE) TO DESTINATION ISAR IN R2 | | |
| 0082 | | | | | * (HIGH BYTE). USES R0. FINAL DESTINATION BYTE | | |
| 0083 | | | | | * ADDR IN ISAR AND R0 CLEAR ON RETURN. | | |
| 0084 | 00A6 | 74 | | | MOV4 LIS | 4 | |
| 0085 | 00A7 | 50 | | | LR | 0,A | R0 = 3 OR 4 COUNTER |
| 0086 | 00A8 | 41 | | | LR | A,1 | |
| 0087 | 00A9 | 0B | | | LR | IS,A | LD SOURCE ISAR |
| 0088 | 00AA | 4C | | | LR | A,S | LD SOURCE BYTE |
| 0089 | 00AB | 54 | | | LR | 4,A | SAVE IN R4 |
| 008A | 00AC | 42 | | | LR | A,2 | |
| 008B | 00AD | 0B | | | LR | IS,A | LD DEST ISAR |
| 008C | 00AE | 44 | | | LR | A,4 | RE-LD SOURCE BYTE |
| 008D | 00AF | 5C | | | LR | S,A | STORE BYTE |
| 008E | 00B0 | 32 | | | DS | 2 | DECR DEST ISAR |
| 008F | 00B1 | 31 | | | DS | 1 | DECR SOURCE ISAR |
| 0090 | 00B2 | 30 | | | DS | 0 | DECR COUNTER |
| 0091 | 00B3 | 94 | F4 | | BNZ | MOV4+2 | LOOP UNTIL 0 |
| 0092 | 00B5 | 1C | | | POP | | |
| 0093 | | | | | * MOV3 SUBROUTINE - MOVES 3 BYTES AS IN MOV4. | | |
| 0094 | 00B6 | 73 | | | MOV3 LIS | 3 | |
| 0095 | 00B7 | 90 | EF | | BR | MOV4+1 | |
| 0096 | | | | | * MVA1 SUBROUTINE - ENTERS ARI1 ADDRESS TO R2 | | |

-continued

| | | | | | | | |
|---|---|---|---|---|---|---|---|
| 0097 | | | | * (DESTINATION) AND DOES MOV4. | | | |
| 0098 | 00B9 | 20 | 1B | MVA1 | LI | O'33' | |
| 0099 | 00BB | 52 | | | LR | 2,A | |
| 009A | 00BC | 90 | E9 | | BR | MOV4 | |
| 009B | | | | * MVA2 SUBROUTINE - ENTERS AR12 ADDRESS TO R2 | | | |
| 009C | | | | * (DESTINATION) AND DOES MOV4. | | | |
| 009D | 00BE | 20 | 3B | MVA2 | LI | O'73' | |
| 009E | 00C0 | 52 | | | LR | 2,A | |
| 009F | 00C1 | 90 | E4 | | BR | MOV4 | |
| 00A0 | | | | * CLR4 SUBROUTINE - CLEARS 4 DIGITS FROM ISAR DOWN. | | | |
| 00A1 | 00C3 | 74 | | CLR4 | LIS | 4 | |
| 00A2 | 00C4 | 50 | | | LR | 0,A | SET R0 = 4 TO START |
| 00A3 | 00C5 | 70 | | | CLR | | CLR ACC |
| 00A4 | 00C6 | 5E | | | LR | D,A | CLR MEM BYTE,DECR IS |
| 00A5 | 00C7 | 30 | | | DS | 0 | DECR R0 |
| 00A6 | 00C8 | 94 | FD | | BNZ | *−2 | BR NOT 0 |
| 00A7 | 00CA | 1C | | | POP | | RETURN |
| 00A8 | | | | * AR11 CLEAR SUBROUTINE---CLEARS AR11 | | | |
| 00A9 | 00CB | 63 | | A1CL | LISU | 3 | |
| 00AA | 00CC | 6B | | | LISL | 3 | |
| 00AB | 00CD | 90 | F5 | | BR | CLR4 | |
| 00AC | | | | * AR12 CLEAR SUBROUTINE---CLEARS AR12 | | | |
| 00AD | 00CF | 67 | | A2CL | LISU | 7 | |
| 00AE | 00D0 | 90 | FB | | BR | A1CL+1 | |
| 00AF | | | | * SHIFT LEFT SUBROUTINE - DOES BCD LEFT SHIFT FROM | | | |
| 00B0 | | | | * CALLER ISAR DOWN THRU BYTE 0. USES R1 AND R2. | | | |
| 00B1 | | | | * MSD SHIFTED OUT IS IN R2 ON RETURN. | | | |
| 00B2 | 00D2 | 70 | | LSFT | CLR | | CLR ACC |
| 00B3 | 00D3 | 52 | | | LR | 2,A | CLR R2 TO START |
| 00B4 | 00D4 | 4C | | | LR | A,S | LD DIGS ZY |
| 00B5 | 00D5 | 51 | | | LR | 1,A | R1 = ZY |
| 00B6 | 00D6 | 15 | | | SL | 4 | ZY TO Y0 |
| 00B7 | 00D7 | C2 | | | AS | 2 | ADD 0X TO Y0 |
| 00B8 | 00D8 | 5E | | | LR | D,A | WRITE YX,DEC IS |
| 00B9 | 00D9 | 41 | | | LR | A,1 | LD ZY |
| 00BA | 00DA | 14 | | | SR | 4 | ZY TO 0Z(0X NEXT PASS) |
| 00BB | 00DB | 52 | | | LR | 2,A | R2 = 0X |
| 00BC | 00DC | 8F | F7 | | BR7 | LSFT+2 | LOOP NOT DONE |
| 00BD | 00DE | 1C | | | POP | | RETURN |
| 00BE | | | | * DISPLAY CURRENT ADDRESS FEEDBACK TABLE | | | |
| 00BF | 00DF | 40 | | DTAB | DC | H'40' | ADDR 4 |
| 00C0 | 00E0 | 30 | | | DC | H'30' | ADDR 3 |
| 00C1 | 00E1 | 20 | | | DC | H'20' | ADDR 2 |
| 00C2 | 00E2 | 10 | | | DC | H'10' | ADDR 1 |
| 00C3 | 00E3 | 70 | | | DC | H'70' | ADDR 0 |
| 00C4 | | | | * VERIFICATION DATA TABLE (COMPLEMENTED) | | | |
| 00C5 | 00E4 | 01 | 4F | VTAB | DC | H'014F' | 0,1 |
| 00C6 | 00E6 | 12 | 06 | | DC | H'1206' | 2,3 |
| 00C7 | 00E8 | 4C | 24 | | DC | H'4C24' | 4,5 |
| 00C8 | 00EA | 20 | 0F | | DC | H'200F' | 6,7 |
| 00C9 | 00EC | 00 | 04 | | DC | 2,4 | 8,9 |
| 00CA | 00EE | 62 | 1C | | DC | H'621C' | A,B |
| 00CB | 00F0 | 3F | 7E | | DC | H'3F7E' | C,D |
| 00CC | 00F2 | 77 | 7F | | DC | H'777F' | E,F |
| 00CD | 00F4 | 20 | EE | DERR | LI | H'EE' | DISPLAY ERROR DISPLAY |
| 00CE | 00F6 | 66 | | | LISU | 6 | |
| 00CF | 00F7 | 6C | | | LISL | 4 | |
| 00D0 | 00F8 | 5D | | | LR | 1,A | LD DISPLAY REG WITH ERROR |
| 00D1 | 00F9 | 8F | FE | | BR7 | *−1 | |
| 00D2 | 00FB | 7D | | | LIS | 13 | |
| 00D3 | 00FC | B4 | | | OUTS | 4 | RELEASE DISPLAY SCAN |
| 00D4 | 00FD | 29 | 00 2D | | JMP | DSPY | |
| 00D5 | | | | | END | | |
| 00 | | | | | | | |

| | | | | | | | | | | |
|---|---|---|---|---|---|---|---|---|---|---|
| A1CL | 00CB | A2CL | 00CF | CLR4 | 00C3 | CLRS | 0003 | DERR | 00F4 | |
| DSP3 | 0044 | DSPY | 002D | DTAB | 00DF | LDLP | 003C | LSFT | 00D2 | |
| MCLK | 00A3 | MCYC | 000D | MOV3 | 00B6 | MOV4 | 00A6 | MVA1 | 00B9 | |
| MVA2 | 00BE | ROT1 | 0024 | ROT2 | 0026 | ROTR | 0013 | VD0 | 005F | |
| VD1 | 0060 | VD2 | 0062 | VD3 | 0074 | VD4 | 0090 | VDI | 004E | |
| VTAB | 00E4 | | | | | | | | | |

What is claimed is:

1. Apparatus for displaying digital information comprising:
   a. display means including an indicator having a plurality of individually operable segments;
   b. control means for storing input data for said display means; said control means coupled to said display means for providing signals corresponding to said input data to said display means for controlling operation of said segments; and
   c. segment status determining circuitry coupled to said display means for sequentially determining the operating status of each segment in response to said signals from said control means and coupled to said control means for sequentially transmitting status signals thereto, individual status signals indicative of the operating status of respective segments;

d. said control means including means for receiving the status signals and verifying that the segments are conveying information corresponding to the input data stored in the control means.

2. The apparatus of claim 1 wherein each segment comprises a light emitting diode and where the display means includes a coupling circuit interposed between the control means and each segment; the segment status determining circuitry operative to selectively monitor the combined voltage drop across each light emitting diode and coupling circuit and to generate a status signal indicative of such voltage drop for transmittal to the control means.

3. The apparatus of claim 2 wherein the segment status determining circuitry comprises:
a. discriminating circuit means for producing a digital status signal for each voltage drop; and
b. switching means for sequentially routing a signal corresponding to the voltage drop across each light emitting diode comprising the display unit to the discriminating circuit means.

4. The apparatus of claim 2 which further comprises drive means coupled to the display means and including means for storing data corresponding to said information and wherein the coupling circuit is electrically connected between said drive means and each segment.

5. Apparatus comprising:
a. display means including one or more indicators; each indicator including seven light emitting diode segments arranged for displaying information; said display achieved by energization of a configuration of said diodes;
b. drive means coupled to the display means for controlling activation of said indicators; said drive means including means for storing binary coded data corresponding to the information;
c. control means coupled to the drive means for receiving and storing said binary coded data and for presenting said data for storage in the drive means; said control means further including storage registers containing a unique sequence of stored bits for each possible indicator energization configuration; and
d. segment status determining circuitry coupled to the display for determining the status of the segments included in each indicator as those segments are energized by the drive means and further coupled to the control means for transmission of a sequence of status signals indicative of each indicator configuration for verification that the sequence generated by the segment status determining circuitry equals the unique sequence stored in the control means corresponding to the data presented to the drive means.

6. The apparatus of claim 5 wherein the display includes a coupling circuit interposed between the drive means and each indicator; the segment status determining circuitry operative to selectively monitor the voltage drop across each light emitting diode and associated coupling circuit to produce a status signal indicative of the voltage drop.

7. The apparatus of claim 6 wherein the segment status determining circuitry comprises:
a. discriminating circuit means for producing a binary output in response to a voltage drop; and
b. switching means for sequentially routing signals corresponding to the voltage drops from the display to the discriminating circuit means thereby generating said sequence of status signals for verification by the control means.

8. Apparatus comprising:
a. display means including one or more indicators; each indicator including a plurality of segments for displaying information through energization of the segments in different combinations;
b. drive means coupled to the display means for controlling energization of said indicator segments to display said information; said drive means including means for storing data corresponding to the information;
c. control means coupled to the drive means for receiving and storing said data and for presenting said data for storage in the drive means; and
d. segment status determining circuitry coupled to the display means for determining the status of the segments included in each indicator as those segments are energized by the drive means and further coupled to the control means for transmission of a series of indicator status signals for comparison with a series of data bits corresponding to the data stored by the control means.

9. The apparatus of claim 8 wherein each segment comprises a light emitting diode and where the display includes a transistor coupled circuit portion for each indicator; the segment status determining circuitry operative to selectively monitor the voltage drop across each light emitting diode and associated coupled circuit portion to produce a status signal indicative of the voltage drop for transmission to the control means.

10. The apparatus of claim 9 wherein the segment status determining circuitry comprises:
a. discriminating circuit means for producing a digital output in response to a signal indicative of a voltage drop; and
b. switching means for routing a predetermined sequence of signals indicative of voltage drops from the display means to the discriminating circuit means and thereby generating the series of status signals.

11. A display verification method comprising:
a. generating data to be displayed;
b. storing the data in a control unit;
c. displaying data stored in the control unit by activating selected display segments in a display unit;
d. generating segment status signals in response to activation of selected display segments comprising:
i. sequentially detecting the activation status of display segments; and
ii. sequentially producing segment status signals indicative of the detected display segment activation status; and
e. comparing the data stored in said control unit with the segment status signals to verify proper functioning of the display.

12. The method of claim 11 wherein generating status signals comprises monitoring an operating condition of each segment in sequence and transmitting segment status signals in sequence to the control unit for storage and comparison with a second sequence of signals corresponding to the data.

13. The method of claim 12 wherein monitoring status signals further comprises transmitting a signal indicative of a voltage drop appearing across a light emitting diode included in each display segment to a discriminating circuit for generation of each status signal in the sequence.

* * * * *